US005483132A

United States Patent [19]

Arata et al.

[11] Patent Number: 5,483,132

[45] Date of Patent: Jan. 9, 1996

[54] CONTROL DEVICE FOR MOTOR-DRIVEN TELESCOPIC ANTENNA

[75] Inventors: Koji Arata, Yokohama; Kazufumi Sato; Yuji Maeda, both of Tokyo, all of Japan

[73] Assignee: Harada Kogyo Kabushiki Kaisha, Tokyo, Japan

[21] Appl. No.: 133,638

[22] Filed: Oct. 7, 1993

[51] Int. Cl.[6] .......... H02P 1/22

[52] U.S. Cl. .......... 318/282; 318/281; 343/714; 343/901; 388/815; 388/912

[58] Field of Search .......... 318/250–283, 318/286, 600–603; 343/711, 713, 715, 900–901; 388/903, 809–815, 912

[56] References Cited

U.S. PATENT DOCUMENTS

| | | | |
|---|---|---|---|
| 4,338,552 | 7/1982 | Pilz et al. | 318/266 |
| 4,514,670 | 4/1985 | Fass et al. | 318/467 |
| 4,730,152 | 3/1988 | Foust et al. | 318/603 |

*Primary Examiner*—David S. Martin

*Attorney, Agent, or Firm*—Koda and Androlia

[57] ABSTRACT

A control device for an electrically driven telescopic antenna including: a counting signal extracting circuit which detects the altered waveform of an rectified current generated during the forward or reverse rotation of a DC motor so as to extract counting signals; a command device which sends a control stop command to a motor drive control circuit when the counted value of the extracted counting signals reaches a certain preset value; a motor current monitoring circuit which monitors the current flow to the motor and outputs information on the completion of the antenna element extension/retraction action when the motor current value exceeds a prescribed value; and a correction device which corrects the counted value based upon the information outputted by the motor current monitoring circuit. The control device can include a large-capacitance capacitor for absorbing power supply fluctuations. In addition, a CPU that includes a control stop command device and counted-value correcting device can be controlled by an oscillation circuit which starts functioning when extension/retraction command signals are issued and stops such an operation when the rotational operation of the motor is completed.

3 Claims, 7 Drawing Sheets

CONTROL DEVICE FOR MOTOR-DRIVEN TELESCOPIC ANTENNA

BACKGROUND OF THE INVENTION

1. Field of Industrial Utilization

The present invention relates to a control device for an electrically driven telescopic antenna in which the length of the telescopic antenna element is controlled by counting an altered waveform of a rectified current that is generated during the rotation of a DC motor which is a driving source of an antenna element extending and retracting mechanism.

2. Prior Art

In one example of a conventional control device for electrically driven telescopic antennas, the rotation of an antenna driving motor is detected by a rotation-detecting mechanism which is, for example, a lead switch system. A pulse signal series that corresponds to the rpm of the driving motor is thus obtained, then the obtained pulse signal series is counted by a counting circuit after waveform shaping. The driving motor is controlled on the basis of this counted value so that the extension/retraction action of the antenna element is controlled.

In the conventional device described above, the rotation of the driving motor is detected by a rotation-detecting mechanism which is a lead switch system, etc. Accordingly, detection errors tend to occur, and the mechanically operated components are easily damaged. As a result, the antenna extension and retraction operations become unstable in a relatively short period of time and a highly reliable operation is not expected.

SUMMARY OF THE INVENTION

The invention of the present application is accomplished based upon the facts described above. The object of the present invention is to provide a control device for an electrically driven telescopic antenna which can execute a stable and reliable antenna element extension/retraction operation over a long period of time.

In order to solve the problems and accomplish the object, the following means are adopted in the present invention:

More specifically, the control device of the present invention includes

- an antenna element installed so that it can be accommodated in an antenna element accommodation tube in such a manner that the antenna element is retracted into and extended out from the accommodation tube,
- an antenna element extending and retracting mechanism operated by a DC motor so that the antenna element is extended out from the accommodation tube when the antenna is in use and is retracted back into the accommodation tube when the antenna element is not in use,
- a motor drive control circuit which causes forward and reverse rotation of the DC motor in the antenna element extending and retracting mechanism,
- a counting signal extracting circuit which extracts counting signals from an altered waveform of a rectified current which is generated when the DC motor makes a forward or reverse rotation via the motor drive control circuit,
- a control stop command means which counts counting signals extracted by the counting signal extracting circuit and then sends a control stop command to the motor drive control circuit when the value counted reaches a preset value,
- a motor current monitoring circuit which monitors an electrical current flowing to the DC motor and then outputs information on the completion of an extension/retraction operation of the antenna element when the value of the electrical current exceeds a prescribed value, and
- a counted-value correcting means which corrects the counted value on the basis of the information that indicates the completion of the extension/retraction operation outputted by the motor current monitoring circuit.

It is desirable to use a large-capacitance capacitor for absorbing fluctuations in the power supply voltage. It is further desirable to use a central processing unit which includes a control stop command means and a counted-value correcting means. In this case, the central processing unit is driven by an oscillation circuit which begins functioning when an antenna element extension/retraction command signal is issued and stops functioning when the rotational operation of the motor is completed.

As a result of the means adopted above, the present invention has the following effects:

(1) The degree of extension of the antenna element is variably controlled by counting the altered waveform of a rectified current that is generated during the rotation of the DC motor which is a driving source for the antenna element extending and retracting mechanism. Accordingly, rotational detection errors caused by contact chattering, etc. are less likely to occur than in the conventional devices in which the rotation of the driving motor is detected by a rotation-detecting mechanism which is a lead switch system, etc. In addition, there are almost no mechanical operating components in the device of the present invention. Thus, the mechanical wear and damage are less likely to occur. Accordingly, stable and reliable operation can be obtained over a long period of time.

(2) In the control device of the present invention, information on the completion of the extension/retraction operation of the antenna element is outputted when the value of the electrical current flowing to the motor exceeds a predetermined point and the counted value is corrected on the basis of this information on the completion of the extension/retraction operation. Accordingly, the gradual accumulation of the current waveform counting errors due to repeated extension and retraction of the antenna element can be avoided, and errors in the degree of extension of the antenna element can be prevented.

(3) If a large-capacitance capacitor for power supply input is employed in the control device of the present invention, fluctuations in the power supply voltage are absorbed by this large-capacitance capacitor. Accordingly, even if large fluctuations occur in the power supply, the effect of the fluctuations can be minimized. For example, when the device of the present invention is applied to an automobile antenna drive control device, the voltage of the vehicle power supply (battery) changes greatly when the starter motor is turned on during the extension/retraction operation of the antenna element. However, even in this situation, the power supply voltage can be stable by the large-capacitance capacitor, the effect of power supply voltage fluctuations can be minimized, and counting errors are avoided.

(4) The oscillation circuit actuates the central processing unit that contains a control stop command means and counted-value correcting means, and the oscillation circuit starts functioning when an antenna element extension/retraction command signal is issued and then ceases functioning when the rotational operation of the motor is completed. In other words, the oscillation circuit operates only during the extension/retraction action of the antenna element. Accordingly, it is very unlikely that electrical noise generated by the oscillation circuit will have a deleterious effect on the control device and other external equipment.

DETAILED DESCRIPTION OF THE INVENTION

Figure 1:
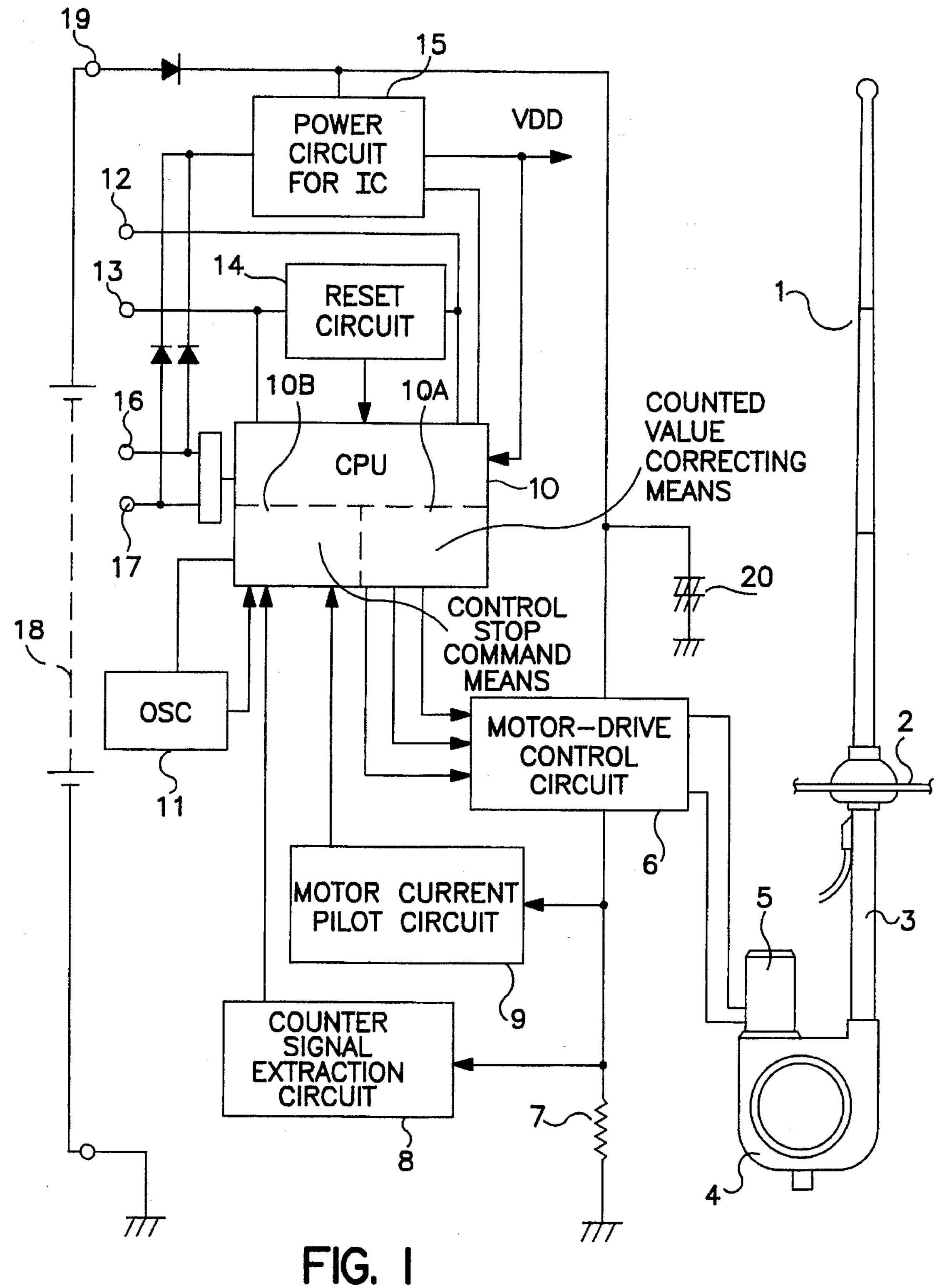
FIG. 1 is a schematic diagram of a control device for an electrically driven telescopic antenna according to one embodiment of the present invention.

FIG. 1 is a schematic diagram of a control device for an electrically driven telescopic antenna for automobiles according to one embodiment of the present invention.

In FIG. 1, reference numeral 1 is an antenna element consisting of a multiple number of conductive pipes of different diameters. These pipes are connected to each other so that they are free to slide. The antenna element 1 can be accommodated in an antenna element accommodation tube 3, which is installed inside the vehicle body wall 2, from outside the vehicle body wall 2. The antenna element 1 is retracted into and extended out from the accommodation tube 3. An antenna element extending and retracting mechanism 4 that works electrically is installed at the base end of the antenna element accommodation tube 3. The antenna element extending and retracting mechanism 4 is operated by the driving force of a brush type DC motor 5. The extending and retracting mechanism 4 extends the antenna element 1 so that the antenna element 1 projects outside of the vehicle body wall 2 from the accommodation tube 3 when the antenna element 1 is in use. When the antenna element 1 is not used, the mechanism 4 retracts the antenna element 1 into the accommodation tube 3.

The DC motor 5 in this antenna element extending and retracting mechanism 4 makes forward and reverse rotations by a motor drive control circuit 6. The motor current flowing to the DC motor 5 also flows to a motor current detecting resistor 7 via the motor drive control circuit 6.

A counting signal extracting circuit 8 detects the altered waveform of a rectified current that is generated when the DC motor makes a forward rotation or a reverse rotation. This waveform is detected from the motor current that flows through the motor current detecting resistor 7. The counting signal extracting circuit 8 also extracts counting signals from this waveform.

A motor current monitoring circuit 9 constantly monitors the motor current flowing through the motor current detecting resistor 7. When the motor current value exceeds a predetermined value upon the completion of the extension/retraction operation of the antenna element 1, the motor current monitoring circuit 9 outputs information that indicates that the extension/retraction operation of the antenna element 1 is completed.

A central processing unit 10, which is hereafter called "CPU", is used as the main control section The CPU 10 contains a control stop command means and a counted-value correcting means (neither one is shown in the drawings). The control stop command means 10B counts the counting signals extracted by the counting signal extracting circuit 8 and sends a control stop command to the motor drive control circuit 6 when the counted value reaches a preset value. The counted-value correcting means 10A corrects the information that indicates the completion of the extension/retraction operation which is outputted by the motor current monitoring circuit 9.

The CPU 10 is driven and controlled by an oscillation circuit 11. The oscillation circuit 11 begins its oscillation immediately after the CPU 10 has been reset by a reset circuit 14 which is actuated when an antenna element extension/retraction command signal is sent to the terminals 12 and 13. As will be described below in detail, the function of this oscillation circuit 11 is stopped by a signal from one of the output ports of the CPU 10 when the rotational operation of the motor 5 is completed.

The reference numeral 15 is an IC power supply circuit. The IC power supply circuit 15 receives power from a vehicle power supply 18 and generates an IC power supply VDD when an ignition signal Ig and an accessory signal ACC are respectively applied to the terminals 16 and 17. This IC power supply VDD is supplied to the IC's in the various parts of the control circuit as well as to the CPU 10.

A large-capacitance capacitor 20 is installed between the output line, which is from the output terminal 19 of the vehicle power supply 18, and the ground. The capacitor 20 is used to absorb fluctuations in the power supply voltage.

Figure 2:
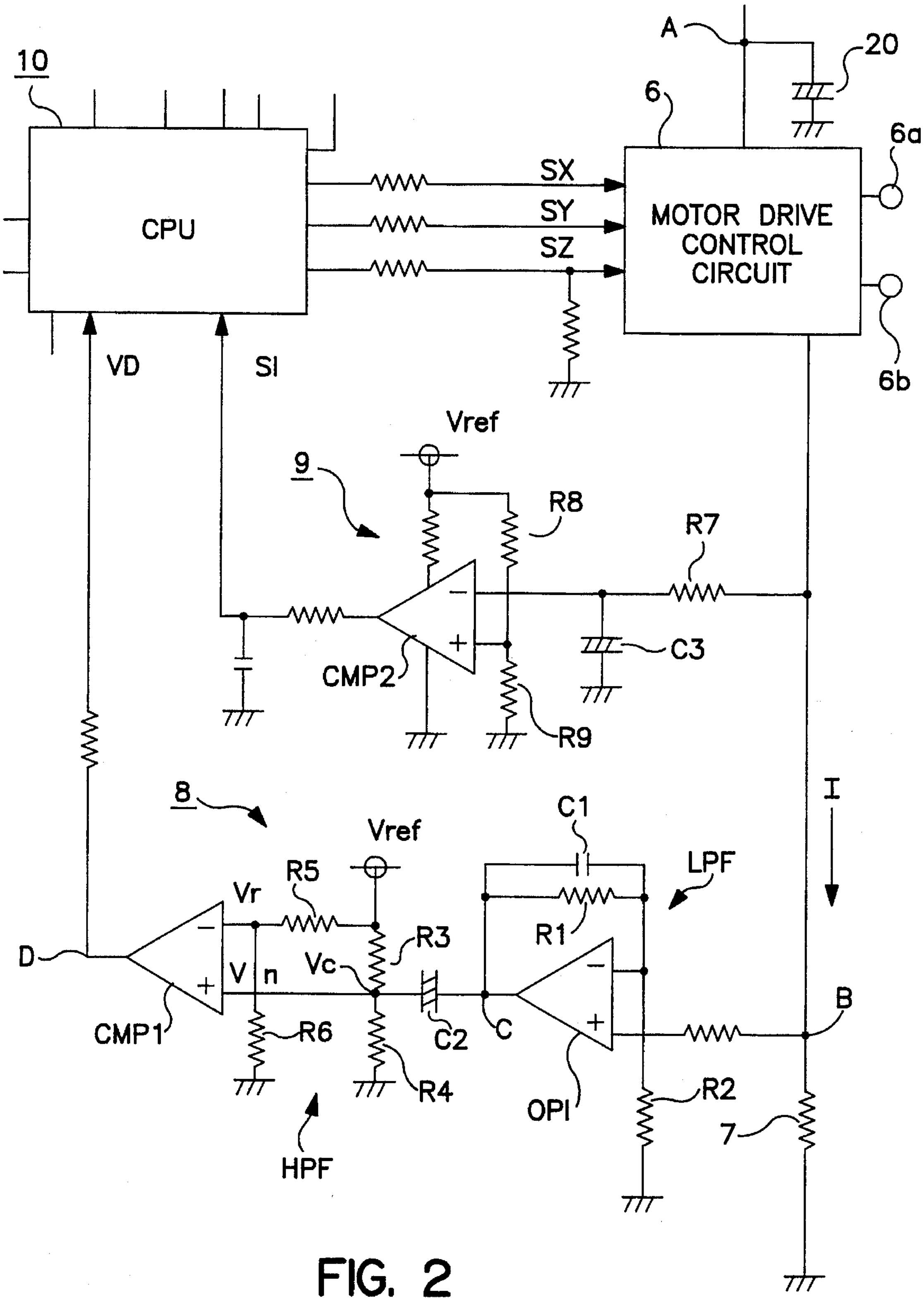
FIG. 2 is a circuit diagram of a motor drive control circuit counting signal extracting circuit and motor current monitoring circuit used in the control device of the embodiment of FIG. 1.

FIG. 2 is a circuit diagram of the motor drive control circuit 6, counting signal extracting circuit 8, motor current monitoring circuit 9, etc. shown in FIG. 1.

When the motor drive control circuit 6 receives control signals SX and SY and a standby signal SZ from the CPU 10, the control circuit 6 sends out the following five different outputs from the output terminals *6a* and *6b* according to whether the signal levels are at a HIGH level (hereafter referred to as "H") or LOW level (hereafter referred to as "L"):

(1) A high-impedance output which is a motor non-rotation output. This is sent out by the control circuit 6 when the level of the control signal SX is L, the level of the control signal SY is L and the level of the standby signal SZ is H.

(2) A motor forward rotation output. This is sent out by the control circuit 6 when the level of the control signal SX is H, the level of the control signal SY is L, and the level of the standby signal SZ is H.

(3) A motor reverse rotation output. This is sent out by the control circuit 6 when the level of the control signal SX is L, the level of the control signal SY is H, and the level of the standby signal SZ is H.

(4) A braking output which stops the rotation of the motor. This is sent out by the control circuit 6 when the level of the control signal SX is H, the level of the control signal SY is H, and the level of the standby signal SZ is H.

(5) A high-impedance output to insure a non-rotation of the motor. This is sent out by the control circuit 6 when the level of the standby signal SZ is L, regardless of whether the levels of the control signals SX and SY are H or L.

When the high-impedance output, which is used to insure the non-rotation of the motor, is sent out, and especially when the level of the standby signal SZ is L as indicated in (5) above, the motor powering circuit is in a completely "floating state" when viewed from the electrical standpoint. In this state, the current consumed by the IC circuits in the motor drive control circuit 6 is reduced, and the circuit power consumption is lowered.

The main components of the counting signal extracting circuit 8 are an operational amplifier OP1 and an operation comparator CMP1. The rectified current I of the brush type DC motor 5 is detected as a voltage level by the motor current detecting resistor 7. However, the level detected is extremely low. Accordingly, the altered waveform of the rectified current I thus detected is amplified by the operational amplifier OP1. If, however, this waveform is merely amplified, the noise from the brush contacts and the commutator in the DC motor 5 will be both amplified at the same time, which causes erroneous counting. Accordingly, with a capacitor C1 and an operation resistor R1, a low-pass filter circuit LPF is obtained so as to amplify the rectified voltage only. The values of C1 and R1 are selected so that frequency components above the frequency of the rectified waveform are cut. The amplification factor of the operational amplifier OP1 is determined by the values of the resistors R1 and R2 in an inverter circuit.

The rectified voltage amplified by the operation amplifier OP1 also contains a DC current component that is applied to the DC motor 5. Accordingly, in order to cut this DC current component, the amplified rectified voltage is caused to pass through a high-pass filter circuit HPF which is made of a capacitor C2 and resistors R3 and R4. The rectified voltage (pulsating current) from which the DC current component has been cut by the high-pass filter HPF is additively synthesized with the voltage Vc (Vc=Vref*R4/(R3+R4)) that is obtained by the resistors R3 and R4.

The rectified voltage (pulsating current) which has passed through the high-pass filter circuit HPF is compared with a reference potential, which is determined by resistors R5 and R6 by the operation comparator CMP1 and is outputted as countable H-level or L-level signals. When it is assumed that the relationship of the resistors R3, R4, R5 and R6 is:

$$R3/R4=R5/R6$$

then the potention Vr on the inverted input side of the operation comparator CMP1 can be shown as:

$$Vr=Vref*R6/(R5+R6)\ \ldots \text{ a constant value}$$

and the potential Vn on the non-inverted input side of the operation comparator CMP1 can be shown as:

$$Vn=Vc+(\text{output voltage of operational amplifier OP1}).$$

Here, $$Vc=Vref*R4/(R3+R4),$$

Accordingly, $$R3=R4*R5/R6$$

leads to the following equations:

$$\begin{aligned} Vc &= Vref*R4/((R4*R5/R6)+R4) \\ &= Vref*R6/(R5+R6)=Vr \end{aligned}$$

Thus, the positive or negative change in the rectified output voltage of the operational amplifier OP1 is the output of the operation comparator CMP1.

The waveforms VA, VB, VC and VD shown in FIG. 5 respectively indicate the voltage waveforms at points A, B, C and D in FIG. 2. More specifically, VA is the waveform of the power supply voltage applied to the motor drive control circuit 6, VB is the waveform of the rotation-detecting voltage generated in the motor current detecting resistor 7 that corresponds to the altered waveform of the rectified current, VC is the waveform of the output voltage of the operational amplifier OP1 and VD is the waveform of the output voltage of the operation comparator CMP1.

Now back to FIG. 2. If the length of the antenna element 1 is controlled by counting the altered waveform of the rectified current I of the DC motor 5, there is a danger that counting errors may accumulate as a result of repeated operation and the antenna element will not be extended to a desired length.

Accordingly, the motor current monitoring circuit 9 is used to constantly monitor the current flowing in the motor 5 so as to detect any abrupt increase in such a current. Thus, the timing at the point immediately preceding the restriction of the motor 5 accompanying the completion of the extension/retraction operation of the antenna element 1 (for example, the completion of the retraction of the antenna element 1) is ascertained. Based on this ascertained information, the value counted by the counting means inside the CPU 10 is corrected to eliminate the accumulation of the counting errors due to the repeated operations. Thus, errors in the extension length that might occur when the antenna element is extended can also be eliminated.

More specifically, the voltage value corresponding to the motor powering current detected by the motor current detecting resistor 7 during the retraction of the antenna element 1 is averaged by the resistor R7 and capacitor C3. This averaged detected voltage value is compared with a prescribed value, specifically, a value obtained by the voltage division of the reference voltage Vref by resistors R8 and R9 by an operation comparator CMP2.

When the motor powering current abruptly increases and exceeds a predetermined value as a result of the completion of the retraction action of the antenna element 1, the operation comparator CMP2 outputs an information signal S1, which indicates the completion of the retraction operation, to the CPU 10. The CPU 10 corrects the counted value on the basis of this information signal S1. This correction of the counted value is performed each time the retraction of the antenna element 1 is completed. Thus, there is no accumulation of errors in the counted value. Accordingly, errors in the extension length caused by repeated extension and retraction actions of the antenna element 1 are eliminated. The predetermined value is set at a voltage level that corresponds to a value which is sufficiently higher than the motor powering current value at the rated load of the motor 5 but is lower than the constraining current value of the motor 5.

If the starter motor of an automobile is driven during the operation of the DC motor 5 for driving the antenna element, the output voltage of the vehicle power supply 18 fluctuates greatly. Since this power supply voltage fluctuation has a conspicuously deleterious effect on the rectified voltage of the motor 5, there is a danger of erroneous counting if such a power supply voltage fluctuation occurs. A similar situation occurs if a vehicle generator (dynamo) is used. In the present embodiment, however, the large-capacitance capacitor 20 is installed which is used for the power supply input. Accordingly, as described above, the deleterious effect arising from the fluctuations in the power supply voltage is minimized by the voltage fluctuation absorbing action of the large-capacitance capacitor 20, and erroneous counting can be avoided.

FIG. 6 shows the voltage waveforms at the points A through D with the large-capacitance capacitor 20 not installed. Since the large-capacitance capacitor 20 is not used, as is clear from FIG. 6, the rotation-detecting voltage waveform VB detected by the motor current detecting resistor 7 and the output voltage waveform VC of the operational amplifier OP1 are both greatly disturbed when there are fluctuations in the power supply voltage waveform VA, and there is a considerable degree of variation in the pulse voltage waveform VD outputted by the operation comparator CMP1. As a result, there is a danger of erroneous counting.

FIG. 7 shows the voltage waveforms at the points A through D with the large-capacitance capacitor 20 installed. As is clear from a comparison with FIG. 6, extreme fluctuations in the power supply voltage waveform VA are inhibited when the large-capacitance capacitor 20 is used. As a result, the rotation-detecting voltage waveform VB detected by the motor current detecting resistor 7, the output voltage waveform VC of the operational amplifier OP1 and the pulse voltage waveform outputted by the operation comparator CMP1 are all more or less the same as the respective waveforms seen during ordinary operation which is shown in FIG. 5. Accordingly, there is almost no possibility of erroneous counting.

Figure 3:
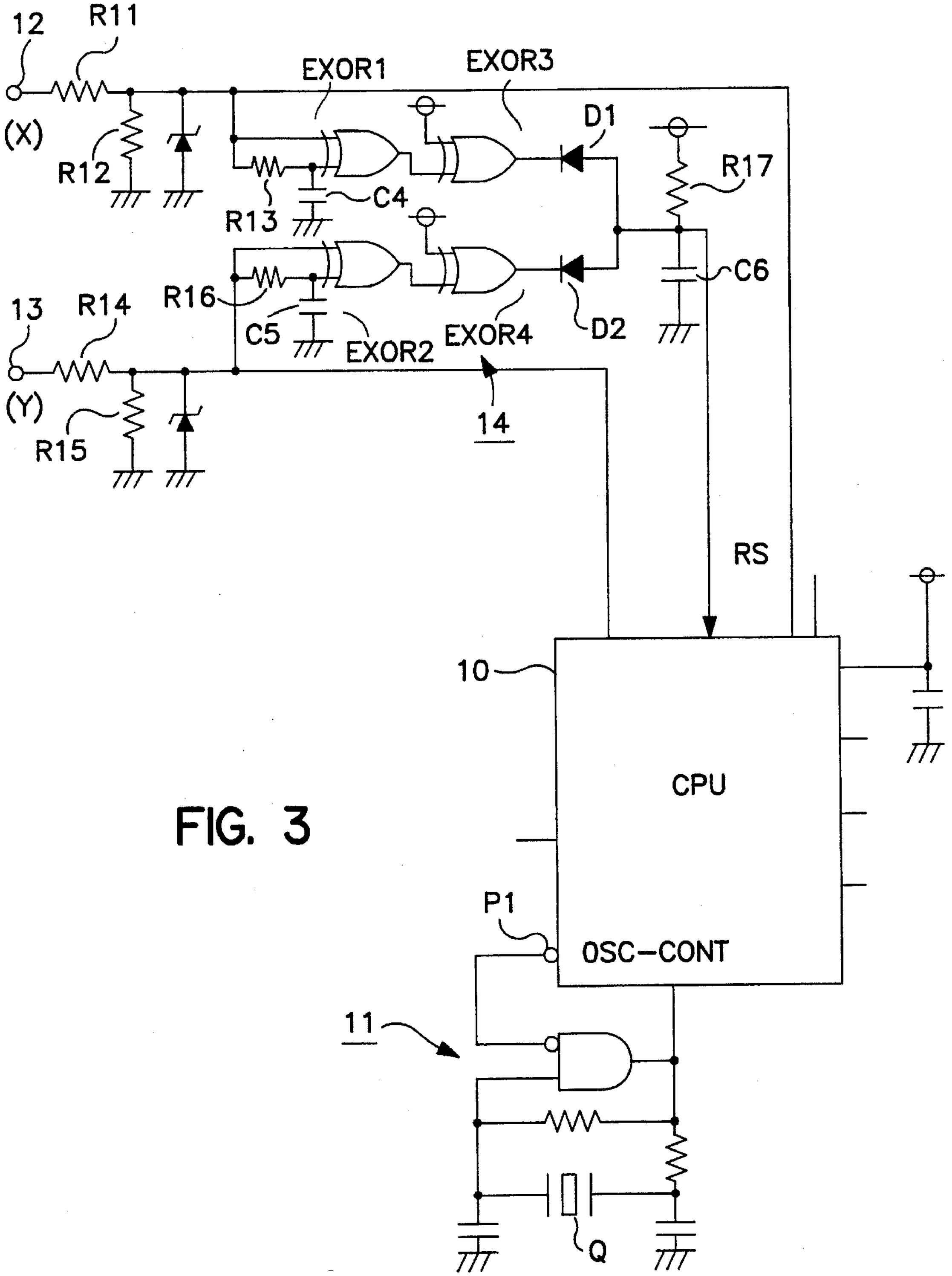
FIG. 3 is a circuit diagram of a reset circuit and oscillation circuit of the control device of the embodiment in FIG. 1.

The description now returns to FIG. 3. FIG. 3 is a circuit diagram which illustrates the structure of the CPU (control part) 10 which contains a reset circuit and an oscillation circuit shown in FIG. 1. When antenna element extension/retraction command signals X and Y are applied to the terminals 12 and 13, the CPU 10 functions in accordance with the respective states of the signals X and Y and outputs antenna element length control signals in the following manner:

(1) The CPU 10 outputs a signal which controls the antenna element 1 to be placed in a retracted state when the levels of the extension/retraction command signals X and Y are both L.

(2) The CPU 10 outputs a signal which controls the antenna element 1 to be extended to an arbitrary length E1 when the level of the extension/retraction command signal X is H and the level of the extension/retraction command signal Y is L.

(3) The CPU 10 outputs a signal which controls the antenna element 1 to be extended to an arbitrary length E2 when the level of the extension/retraction command signal X is L and the level of the extension/retraction command signal Y is H.

(4) The CPU 10 outputs a signal which controls the antenna element 1 to be extended to an arbitrary length E3 when the levels of the extension/retraction command signals X and Y are both H.

When the antenna element extension/retraction command signals X and Y change as described above, a reset circuit 14 consisting of "or else circuits" EXOR1 through EXOR4 is actuated. After sending a reset signal RS to the CPU 10, the reset circuit 14 causes the internal circuits of the CPU to begin operation. More specifically, when the level of the extension/retraction command signal X changes from L to H, or from H to L, a rectangular wave, that corresponds to a time constant determined by the resistors R11 through R13 and capacitor C4 is outputted by the "or else circuit" EXOR1. When the extension/retraction command signal Y makes a similar change, a rectangular wave, that corresponds to a time constant determined by the resistors R14 through R16 and capacitor C5 is outputted by the "or else circuit" EXOR2. The respective polarities of the rectangular waves outputted by the "or else circuits" EXOR1 and EXOR2 are reversed by the "or else circuits" EXOR3 and EXOR4, and the rectangular waves are logically summed by the resistor R17 and diodes D1 and D2. This logically summed signal is inputted into the CPU 10 as the reset signal RS. The resistor R17 and capacitor C6 in the reset circuit 14 are used to generate a "power on" reset signal at the time that the power supply of the control device is initially switched on. Thus, each time the extension/retraction command signals X and Y changes, a hard reset is applied to the CPU 10 from the reset circuit 14, so that the oscillator control signal OSC-CONT outputted from port P1 of the CPU 10 is caused to form an initial-state L-level output, thus causing the oscillation circuit 11 to begin oscillation. As a result, the CPU 10 begins operation according to a program.

Thus, even if the CPU 10 should temporarily run out of control due to external noise, etc., the operation of the CPU 10 will begin from the initial state each time as a result of the reset action which accompanies any change in the antenna element extension/retraction command signals X and Y. After the CPU 10 has completed a prescribed operation according to the program, the oscillation circuit control Bit is switched to H level, so that the oscillating action of the oscillation circuit 11 is stopped.

In the oscillation circuit 11, the oscillator Q is controlled by the oscillation control signal OSC-CONT which is outputted from the port P1 of the CPU 10 in accordance with the resetting action performed by the reset circuit 14. More specifically, when the CPU 10 is reset, the oscillation circuit control Bit is switched to L level; as a result, the oscillation circuit 11 begins to oscillate and causes the CPU 10 to start functioning. When the antenna element extension/retraction command signals X and Y are cut off, the oscillator Q is controlled so that it stops oscillating. In other words, when the CPU 10 completes a prescribed operation, the oscillation circuit control Bit of the CPU 10 is switched to H level so that the oscillation circuit 11 stops its oscillating action.

Thus, the oscillation circuit 11 is caused to stop its oscillating action except during the extension/retraction operation of the antenna element 1, i.e., except during the operation of the motor 5. As a result, the radiation or conduction of harmful electromagnetic wave noise from the oscillation circuit at times other than the extension/retraction operation of the antenna element 1 can be inhibited, and deleterious effects on external devices, etc. are eliminated.

Generally, in control circuits which use a CPU, the oscillation circuit functions constantly while power is being supplied to the CPU. As a result, electrical noise from the oscillation circuit is radiated or conducted to all parts of the device, and this electrical noise has a deleterious effect on not only the device itself and but also other external devices, etc. Especially in the case of an antenna drive control device such as of the present device, even extremely faint electromagnetic waves are received. As a result, the electrical noise enters the antenna and is inputted into the receiver set. Thus, the deleterious effect is great.

In the control device of the present invention, however, the oscillation circuit 11 is stopped by a signal from the output port P1 of the CPU 10 after the motor 5 has completed a prescribed operation. As a result, electrical noise generated by the oscillation circuit 11 is eliminated, and there is no deleterious effect on other external devices. Restarting of the oscillation of the oscillation circuit 11 is accomplished by resetting the CPU 10 by the reset signal RS created by changes in the extension/retraction command signals X and Y.

Figure 4:
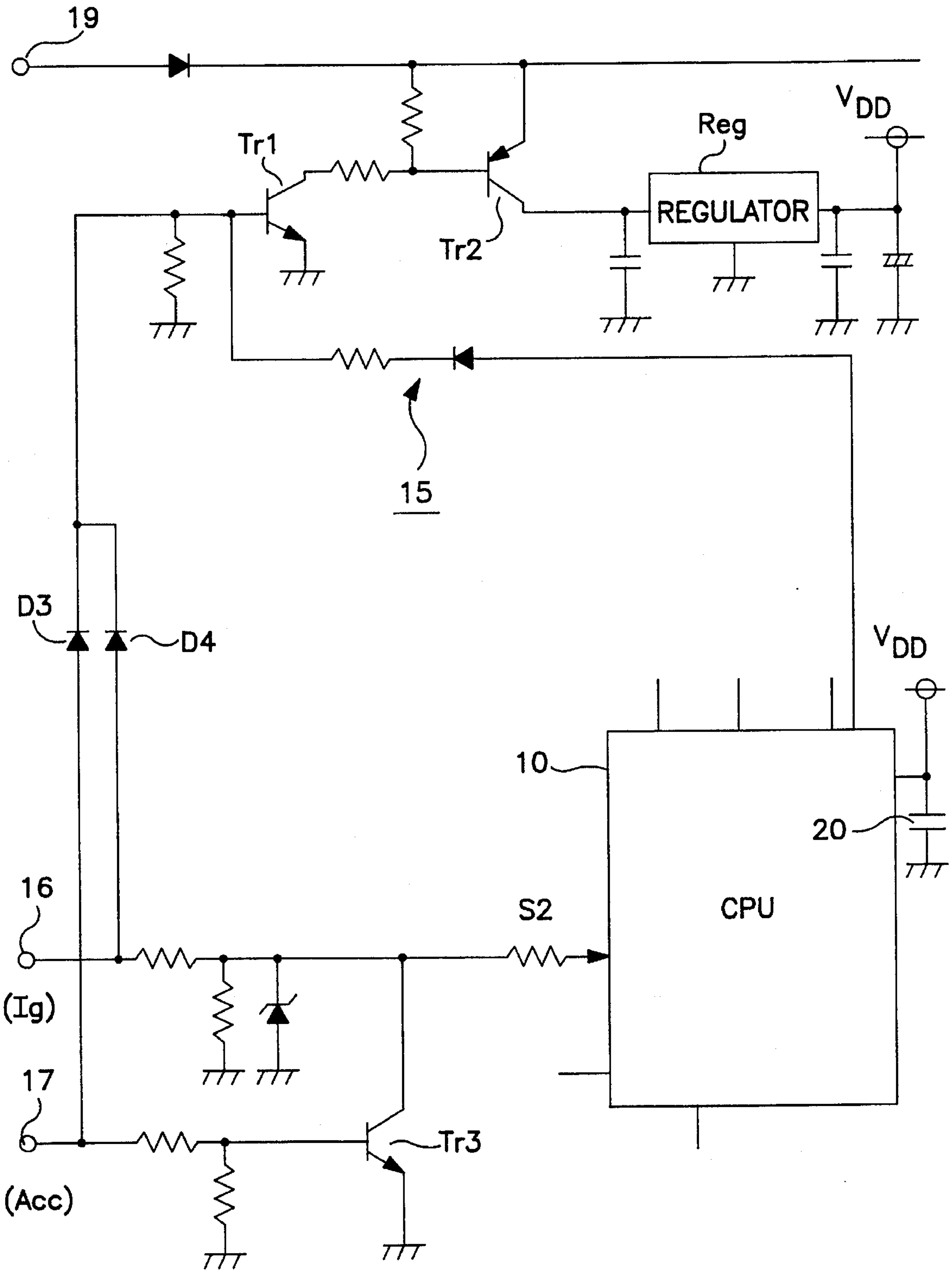
FIG. 4 is a circuit diagram of an IC power supply circuit of the control device of the embodiment of FIG. 1.
Figure 5A:
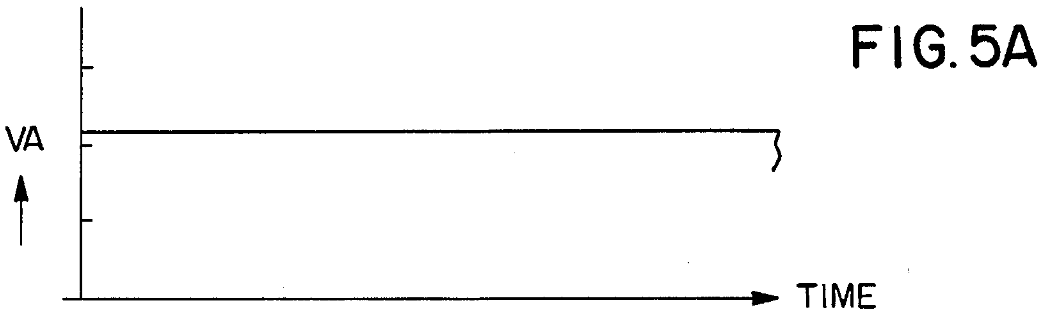
FIG. 5 is a diagram showing waveforms at various points to illustrate the operation of the control device of the embodiment of FIG. 1.
Figure 5B:
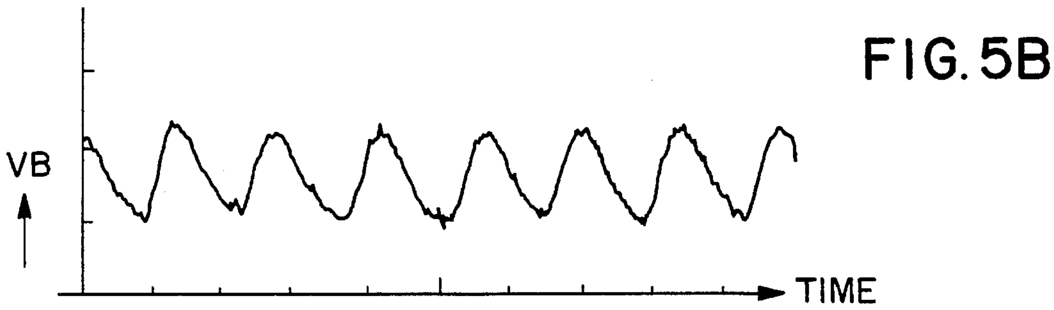
Figure 5C:
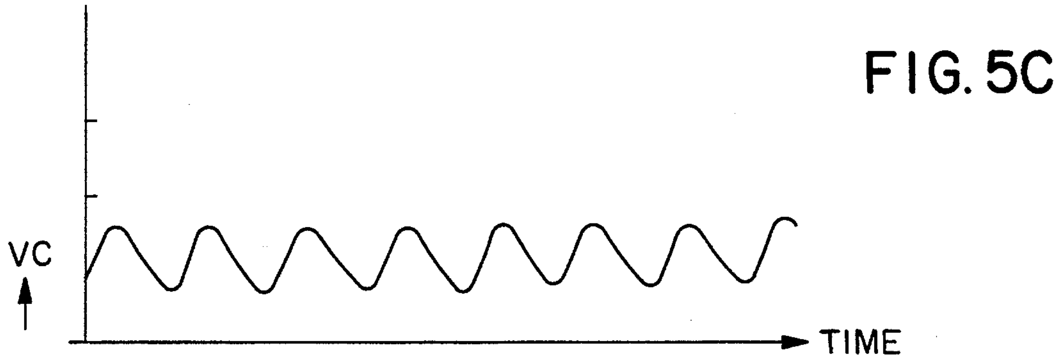
Figure 5D:
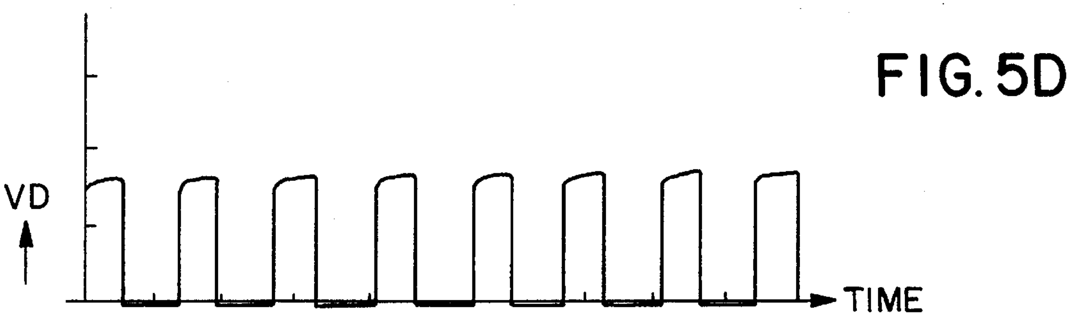
Figure 6A:
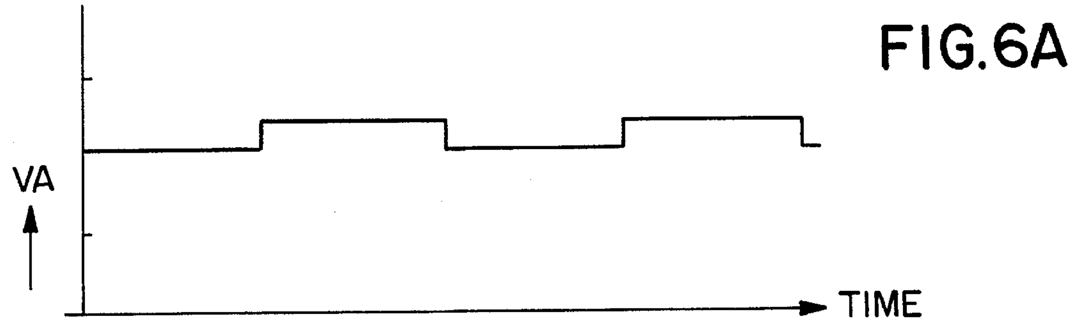
FIG. 6 is a diagram showing waveforms at various points illustrating the operation of the control device of the embodiment of FIG. 1.
Figure 6B:
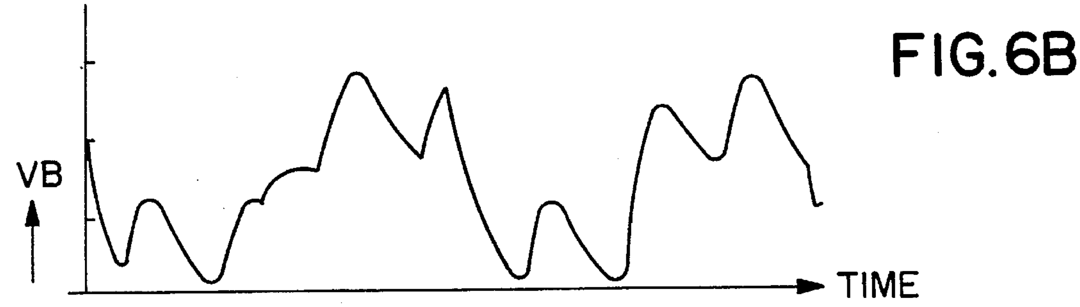
Figure 6C:
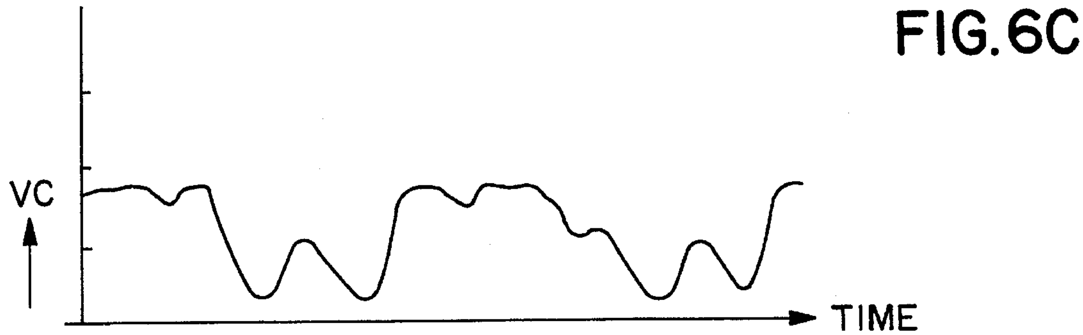
Figure 6D:
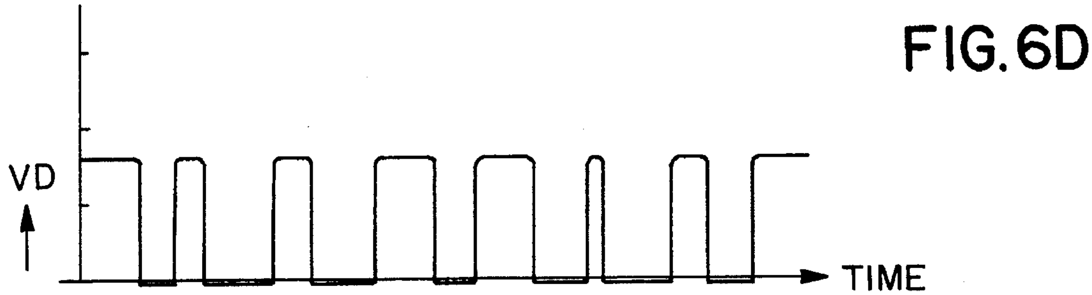
Figure 7A:
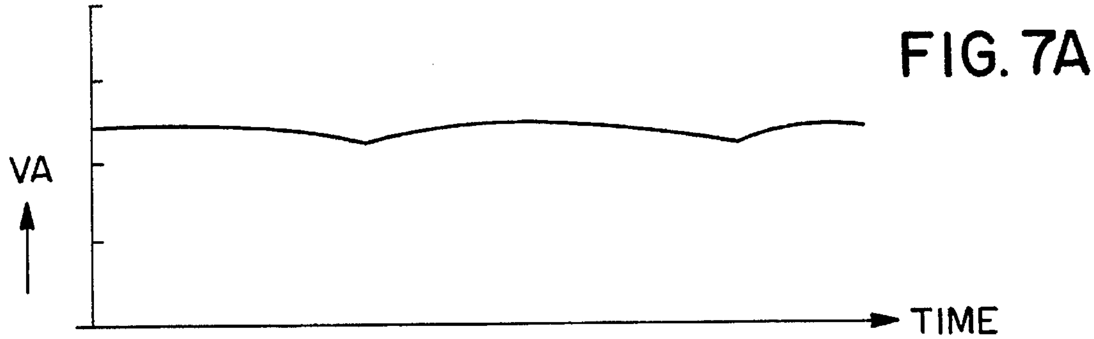
FIG. 7 is a diagram showing waveforms at various points illustrating the operation of the control device of the embodiment of FIG. 1.
Figure 7B:
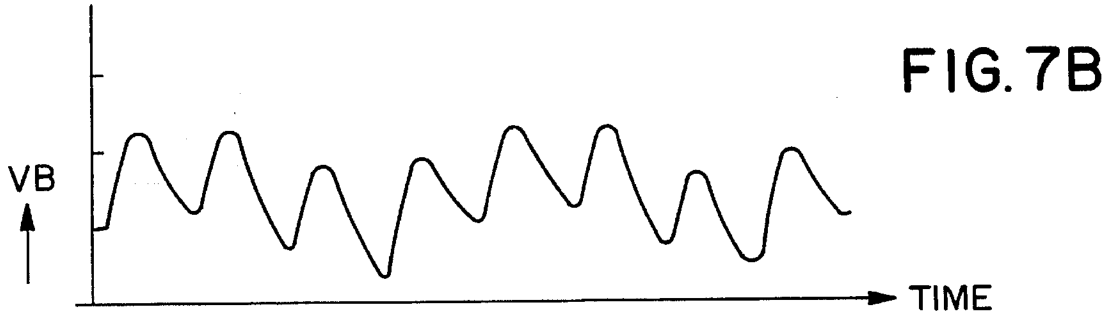
Figure 7C:
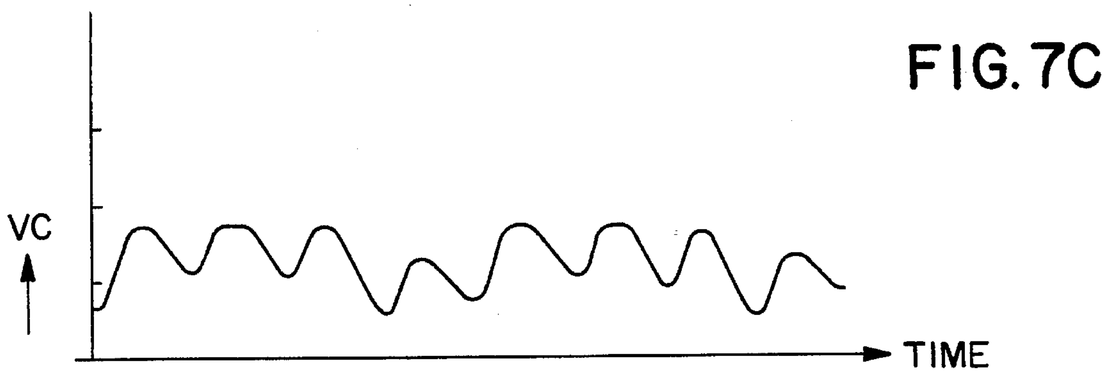
Figure 7D:
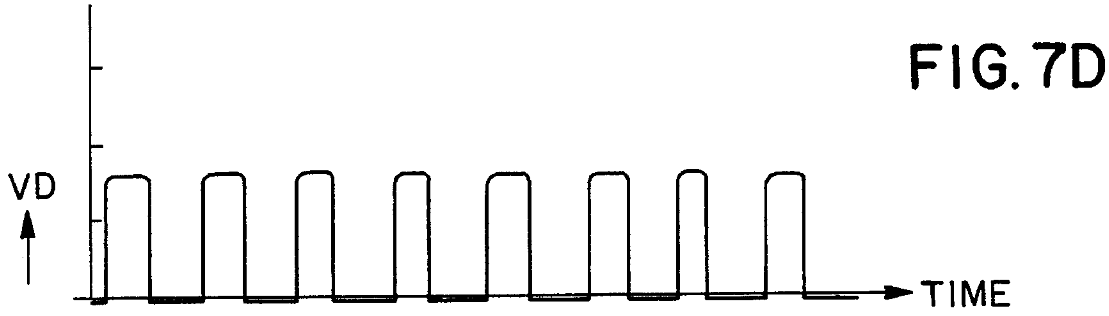

FIG. 4 shows in a concrete manner a circuit diagram of the structure of the IC power supply circuit 15 shown in FIG. 1. When an ignition signal Ig or accessory signal Acc is inputted into one of the terminals 16 and 17, the signal passes through the diodes D3 and D4S so that the transistors Tr1 and Tr2 are switched on. When the transistor Tr2 is switched on, power is supplied to the voltage regulator Reg via the output terminal 19, so that an IC power supply VDD is outputted. As a result, the CPU 10 becomes active.

When the engine of an automobile is started, the level of the ignition signal Ig becomes H, and the level of the accessory signal Acc becomes L. Accordingly, the collector output potential of the transistor Tr3 is at an H level, so that a signal S2 is inputted into the CPU 10. If the motor 5 is in operation at this time, the CPU 10 stops the motor 5 as long as the signal S2 maintains an H level.

The present invention is not limited to the embodiments described above. It goes without saying that various modifications are possible within the spirit of the present invention.

The present invention possesses the following merits:

(1) The control device of the present invention is designed so that the degree of extension of the telescopic antenna element is variably controlled by counting the altered waveform of a rectified current that is generated during the rotation of a DC motor which is the driving source of the antenna element extending and retracting mechanism. Accordingly, rotation detection errors caused by contact chattering, etc. are less likely to occur than they are in the conventional devices in which the rotation of the motor is detected via a rotation-detecting mechanism consisting of a lead switch system, etc. Furthermore, almost no mechanical operating parts are involved. Accordingly, mechanical wear and damage do not occur, and a stable and reliable operation of the antenna can be secured over a long period of time.

(2) The device of the present invention is designed so that information that indicates the completion of the extension/retraction operation of the antenna element is outputted when the value of the current flowing to the counted value is corrected based upon this information on the completion of the extension/retraction operation. Accordingly, the gradual accumulation of current waveform counting errors due to repeated extension and retraction actions of the antenna element can be avoided, and errors in the degree of extension of the antenna element which is controlled in its extension and retraction can be prevented.

(3) If a large-capacitance capacitor used for the power supply input is employed in the device of the present invention, fluctuations in the power supply voltage are absorbed by the large-capacitance capacitor. Accordingly, even if there are large fluctuations in the power supply, the effect of these fluctuations can be minimized. For example, if the device of the present invention is applied to an automobile antenna drive control device, the voltage of the vehicle power supply (battery) fluctuates greatly when the starter motor is driven during the extension/retraction operation of the antenna element. However, even in such cases, the power supply voltage is stabilized by the large-capacitance capacitor, and the effect of power supply voltage fluctuations is minimized, eliminating counting errors.

(4) The oscillation circuit is mounted on and used to drive the central processing unit that includes a control stop command means and a counted-value correcting means. The oscillation circuit starts functioning when an antenna element extension/retraction command signal is issued and ceases functioning when the rotational operation of the motor is completed. In other words, the oscillation circuit functions only during the extension/retraction operation of the antenna element. Accordingly, there is very little danger that electrical noise generated by the oscillation circuit will have a deleterious effect on the device itself or on other external devices.

(5) In view of the above, the invention is able to provide a drive control device for an electrically driven telescopic antenna which can secure a stable and reliable operation over a long period of time.

We claim:

1. A control device for an electrically driven telescopic antenna comprising:

an antenna element accommodated in an antenna element accommodation tube so that said antenna element can be freely retracted into and extended out from said accommodation tube;

an antenna element extending and retracting mechanism electrically operated by a driving force of a DC motor so that said antenna element is extended out from said accommodation tube during use and retracted into said accommodation tube during non-use;

a motor drive control circuit which causes said DC motor to rotate in a forward or reverse direction in said extending and retracting mechanism;

a counting signal extracting circuit which detects an altered waveform of a rectified current which is generated when said DC motor is rotated in a forward or reverse direction by said motor drive control circuit, said extracting circuit then extracting pulse signals from said altered waveform;

a control stop command means which counts said pulse signals extracted by said counting signal extracting circuit, said control stop command means then sending a control stop command to said motor drive control circuit when a value counted by said control stop command means reaches a certain preset value;

a motor current monitoring circuit which monitors a current flowing to said motor, said monitoring circuit outputting information on a completion of an extension/retraction operation of said antenna element when a value of said current exceeds a prescribed value; and a counted-value correcting means which corrects said value counted by said control stop command means in response to said information on a completion of extension/retraction operation which is outputted by said motor current monitoring circuit when said information is outputted by said motor current monitoring circuit before a value counted by said control stop command means reaches said certain preset value.

2. A control device for an electrically driven telescopic antenna according to claim 1, further comprising a large-capacitance capacitor that is used to absorb fluctuations in the power supply voltage.

3. A control device for an electrically driven telescopic antenna according to claim 1, further comprising a central processing unit which includes said control stop command means and counted-value correcting means, said central processing unit being driven-controlled by an oscillation circuit which begins functioning when an antenna element extension/retraction command signal is issued and stops functioning when a rotational operation of said motor is completed.

* * * * *